Nov. 1, 1938.　　　C. M. HOUSTON　　　2,135,287
STAR MAP
Filed March 7, 1936
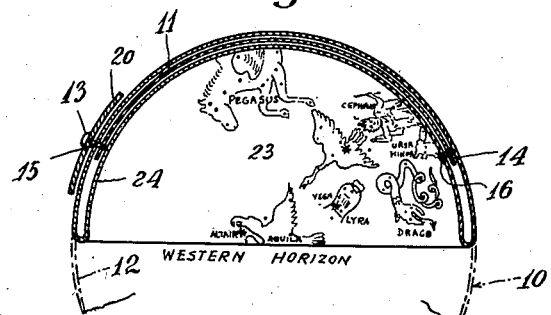
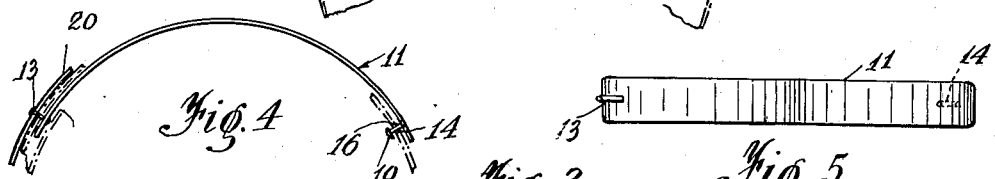
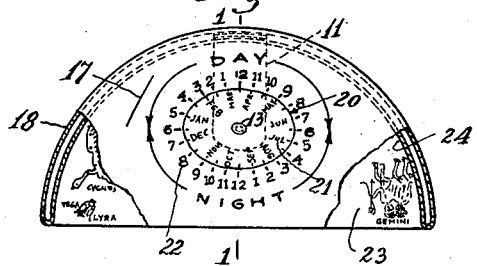
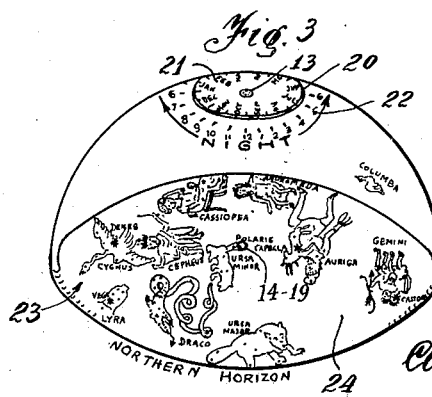
Claude M. Houston,
INVENTOR.
BY Ralph Donath
ATTORNEY Patented Nov. 1, 1938

2,135,287

UNITED STATES PATENT OFFICE 2,135,287

STAR MAP

Claude M. Houston, Pittsburgh, Pa.

Application March 7, 1936, Serial No. 67,652

10 Claims. (Cl. 35—44)

This invention relates to hemispherical star maps.

One of the objects of this invention is to provide a star map in which various star groups and positions are shown exactly as they appear to the eye of the observer who views the sky facing any horizon.

Another object of the invention is to provide a star map in which distortions and inaccuracies, always present when showing a spherical area on a plane surface, are eliminated.

Yet another object of the invention is to provide a hemispherical star map in which the concave hemispherical area is manually adjustable to represent the visible sky at the desired hour of the day or night for any time of the year.

Still another object of the invention, as a manufacturing sequence, is to depict a star map on the outer surface of a spherical body, made of thin elastic material, collapse the same so as to form a hemisphere or bowl with a double wall in which approximately one half of the outer surface of the spherical body forms a convex surface of the hemispherical double walled bowl and the remaining half forms the inner concave surface of the bowl which latter surface shows the star map to be viewed by the observer.

Another object of the invention is to provide a hemispherical star map, having the shape of a bowl, which is folded along a great circle line of the original hollow sphere and in which the edge or rim (great circle line) represents the horizon of the concave surface of the star map showing the visible sky.

Yet another object of the invention is to provide a hemispherical star map with a mechanical member inserted between the double walls of the bowl which effects pivoting of the star map about polar points as it moves relatively between these walls of the bowl representing the visible sky and which indicates the hour of the day or night for any time of the year corresponding to the position of the sky which is represented within the bowl as then visible on the star map.

Still another object of this invention is to provide a hemispherical star map which can be folded into a small volume without injury and which can be carried in the pocket or can be placed in a small receptacle, when not in use.

Other objects and advantages of the invention to be derived from the use of my improved hemispherical star map will appear from the following detail description of the accompanying drawing, in which:—

Figure 1 is a sectional view of a hemispherical star map embodying my invention along line 1—1 in Figure 2.

Figure 2 is a fragmentary outline view of the invention.

Figure 3 is a perspective view of the invention.

Figure 4 is a side elevation of the member which effects pivoting of the star map about a polar point.

Figure 5 is a top view of Figure 4.

Ordinarily, star maps used by amateur astronomers are printed on a plane surface, such as cardboard or paper, and in this state it is very difficult to study the stars, due to distortions and inaccuracies which occur when attempting to depict a spherical area on a plane surface. These disadvantages have been eliminated by producing a star map which shows the star groups exactly as they appear to the eye of an observer who views the sky facing any horizon. I attain this end by the following steps of manufacture.

Upon the outer surface of a hollow spherical body 10, of thin and flexible sheet rubber (or any other suitable material), is depicted the positions of the principal stars and constellations as they appear in the apparent concave spherical surface of the heavens surrounding the earth. These star groups are located on the outer surface of the sphere, not as an observer from outside of the apparent stellar system would see them when looking toward the earth, but according to a mirror image of that view. In other words, the star groups are located on the outside surface of the sphere in relations to the celestial meridians and parallels, just as an observer on the earth would see them when looking at the inside surface of the celestial sphere of the heavens.

The next step of manufacture is to collapse the hollow sphere into a double-walled bowl or hemisphere, as shown in Figures 1, 2 or 3 of the drawing.

Assume that we wish to have a star map of the sky as seen from the 40th north geographical parallel. Then the collapsing of the hollow sphere would be done so that the north polar point of the sphere falls inside the bowl about 40° from the equatorial bending line, or 40° from the rim of the bowl. The rim of the bowl now depicts the visible horizon of the sky, and the inside of the bowl will show the stars, groups and constellations visible to an observer from the 40th north geographical parallel of the earth.

The north polar point (North Star) is 40° from the horizon, on the inside of the bowl.

The south polar point of the original sphere is now on the outside surface of the bowl, and also 40° from the rim of the bowl.

In Figure 1, the north polar point is indicated by 16 and the south polar point is indicated by 15.

In changing the star map picture shown on the inside of the bowl, it will be seen that the location of the north and south polar points must always be kept in the same place and the walls of the bowl must be manipulated so as to bring new areas from the outside surface to the inside surface of the bowl, and vice versa, areas now shown on the inside of the bowl will be moved around over the rim to the outside of the bowl (except those circumpolar stars within 40° of the North Pole, which merely swing around the pole point, always on the inside of the bowl).

In my star map device, these movements are imposed and regulated by means of a narrow, flat lineally curved strip 11, (about 100° arc length for 40° latitude maps) located between the walls of the bowl, and having pivot pins 14 and 13 extending thru the walls; pivot 14 extends thru the inner wall at the north polar point while pivot 13 extends thru the outer wall at the south polar point. Strip 11 is inserted into the interior thru a slit in the outer wall surface which never appears on the inside (star map) surface of the bowl, i. e. the slit is within 40° of arc from the south polar point.

After strip 11 is in proper position, the North Pole pivot pin 14 is riveted over, as to form head 19 of Figure 4, thus retaining it at the north polar point of the star map. Similarly, South Pole pivot pin 13 is fastened in position, but South Pole pivot pin 13 has rigidly attached to itself the circular dial 20, just outside of the wall of the bowl. Circular dial 20 has printed on its peripheral edge, the names of the months 21. The months can be further graduated into days if desired. On the outer surface of the bowl, in close proximity to the periphery of said dial 20, is printed the hours 22 of the day and night, as best shown in Figure 2. All of these index markings and devices on the outside surface, are within an area never appearing on the inside (star map) surface of the bowl, i. e. they are within 40° of arc from the south polar point. Any other data, instructions or information can also be printed on this same outer area if desired.

Before rigidly fastening circular dial 20 to the pivot pin 13, care is taken, of course, to have the month and day markings 21 on its periphery, match the hourly figures 22 on the outer bowl surface, to correctly indicate the sky map which is then in view on the inside hemispherical surface of the bowl.

This essentially completes the steps in the manufacture of the device and the star map is now ready for use.

As depicted in Figure 3, the star map there shown is set to observe on the inner hemispherical surface 24 of the bowl 23, the positions of the various star groups as they appear to an observer on the month, day and hour as indicated by the dial in conjunction with the imprinted hours on the outside of the bowl; for instance the dial as shown, is now set to observe the star groups for the middle of December at 7:00 P. M. or for the end of August at 2:00 A. M. or for the beginning of April at 12:00 noon, (the sun, of course, makes the stars invisible at 12:00 noon, but the star map shows the location of them in the heavens at that time).

The user of the star map need only remember that the inside of the bowl represents, in miniature, the apparent celestial bowl of the natural sky which he sees overhead and down to the horizon. Thus if he faces north and, preferably for a beginner, holds the star map bowl over head or above eye level, with the north horizon rim pointing in the northerly direction, then the identified stars, groups or constellations he sees inside the bowl are those he will see in the northern zone of the natural heavens from horizon to zenith, as partially shown in Figure 3. Similarly in facing any other horizon, as for instance, the western horizon shown in the sectional view of Figure 1, the map is held with the western horizon rim toward the west and the bowl shows the stars then visible to him in the heavens from the western horizon to the zenith. And in every case, the star groups are shown on the star map bowl exactly in the same aspects and relations to other visible stars and groups as he sees them when looking at the natural heavens. This is the unique feature of my star map, the only star map which can boast of showing the stars at all times and in all portions of the visible heavens, just as they actually appear to an observer on the earth. This feature cannot otherwise be obtained except in the elaborate complicated and costly mechanisms of planetarium devices inside large dome-shaped rooms, as the Hayden Planetarium in New York city or the Adler Planetarium in Chicago.

And incidentally, my invention is also adaptable to large scale construction to operate as the hemispherical dome of a large circular room (as the planetariums), within which audiences can gather and watch accurate reproductions of the motions of the stars in their traverses across the sky.

Now, to change the star map picture, (suppose, for example, it is desired to show the sky at 9:00 P. M. on August 1st instead of at 3:00 A. M. August 1st as is now shown on the drawing:

The bowl, as in Figure 2 or Figure 3, is grasped with the thumbs and fingers of each hand, thumbs inside the bowl and fingers on the outside of the bowl near opposite edges of the rim or horizon line; for instance, the right thumb might touch at "Gemini" and the left thumb at "Cygnus", Figure 2 or 3; manipulate thumbs and fingers in opposite directions, sliding the two walls of the bowl past each other between each thumb and finger, so as to simultaneously roll the outer wall of the bowl over the horizon rim to the inside of the bowl at the right side, and, vice versa, roll the inner wall of the bowl over the horizon rim to the outside of the bowl on the left side. These complementary movements must take place because of the pivoting action the walls are forced to make around pivot pins 14 and 13.

The northern zone star groups will move in a counterclockwise circle around the North Pole point as a center; new star groups will come over the eastern horizon (right side) and appear on the inside of the bowl there; the formerly visible stars will disappear over the western horizon (left side), just as the stars rise and set in the natural sky. Continue the movement, glancing at the index, until the hour figure "9" of the "Night" arc comes opposite the word "August" on the dial index; and then the star groups shown on the inside of the bowl will be those visible in the natural sky on August 1st at 9:00 o'clock P. M.

Similarly, for any other time of the year, at any hour of the day or night, the invention can be altered and set to show on the interior of the bowl the stars which are visible in the natural heavens at that time.

Observation of the movements on the inside of the bowl as the map picture is changed, will show that the invention reproduces accurately and without distortion the true appearance and movement of the stars in the sky, their rising, their traverse in arcs across the sky, and their setting, showing correctly their altering aspects irrespective of whether shown near any horizon or high up in the sky. That feature is something no flat star map does nor can do, which is the reason that amateur or lay star students cannot recognize and identify near-horizon constellations from the usual star maps. A constellation will lie on its left side when rising (eastern horizon) and lie on its right side when setting (western horizon); the two aspects are very different to an observer standing on the earth looking at them, and both aspects again differ from the appearance when the constellation is high in the sky near the meridian, which is how the usual flat star map depicts them.

My star map always shows the star groups in aspects just as they actually appear to an observer on the earth, irrespective of in what portion of their celestial traverse they are located.

My star map device is adaptable to satisfactory use at any place on the earth's surface. As has been mentioned, the figures shown on the drawing, depict a star map which is about correct for the 40th north geographical parallel of the earth, or the approximate latitude of Pittsburgh, Pa., or Madrid, Spain, or Peiping, China. For all practical purposes of popular use, this map would be sufficiently correct for a parallel zone covering 15 degrees or 20 degrees of longitude. However, in Alaska or in Mexico, say a different curved strip 11 would be used; strip 11 would be shorter for Alaska to bring the North Pole higher up in the sky toward the zenith; while for Mexico, strip 11 would be longer to bring the North Pole lower in the sky toward the horizon.

For the southern geographical hemispheres as South America, South Africa or Australia, the South Pole pivot 13 is the one that is inside the bowl and the North Pole point 14 is outside of the bowl and it is the North Pole pivot pin which then carries the index dial 20.

It is possible to design my star map device so that different curved strips 11 can be furnished and assembled by the user, to fit one star map for practically any latitude it is desired to use it. However, it is preferable to manufacture a map for only one suitable zone of latitude, and to use different star maps for any other zone differing greatly in latitude.

While I have illustrated and described my invention, I do not desire to be limited to the structural details so illustrated and described; but intend to cover all forms and arrangements which fall within the terms employed in the definitions of my invention constituting the appended claims.

I claim:—

1. As an article of manufacture, a star map comprising a hollow spherical body of resilient material collapsed into the shape of a double walled hemispherical bowl, and a star map depicted on the surface of said spherical body.

2. As an article of manufacture, a star map comprising a hollow spherical body of resilient material collapsed along a variable equatorial bending line into the shape of a hemispherical bowl and a star map depicted on the inner concave surface of said bowl.

3. As an article of manufacture, a star map comprising a hollow spherical body of resilient material collapsed along a variable equatorial bending line into the shape of a double walled bowl and a star map originally depicted on the outer surface of said spherical body and arranged to appear on the inner concave surface of said bowl.

4. As an article of manufacture, a star map comprising a hollow spherical body of resilient material collapsed along a variable equatorial bending line into the shape of a double walled bowl, a star map depicted on the inner surface of said bowl and means to define said equatorial bending line.

5. As an article of manufacture, a star map comprising a hollow spherical body of resilient material collapsed along a variable equatorial bending line into the shape of a hemispherical double walled bowl, a star map depicted on the inner concave surface of said bowl and adjustable means to define said equatorial bending line relative a selected chronical period.

6. As an article of manufacture, a star map comprising an initially hollow spherical body of resilient material collapsed along an equatorial bending line into the shape of a double walled hemispherical bowl; a star map positioned on the inner concave surface of said bowl, and an arcuate member pivotally mounted between the walls of said hemispherical bowl to define said equatorial bending line.

7. As an article of manufacture, a star map comprising an initially hollow spherical body of resilient material collapsed along an equatorial bending line into the shape of a double walled hemispherical bowl; a star map depicted on the inner concave surface of said bowl; an arcuate member pivotally mounted at its ends between the walls of said hemispherical bowl to define said equatorial bending line; an indicator disc secured to one of the pivots of said member and positioned in substantial parallel relation to and outwardly of the outer convex face of said hemispherical bowl; another indicator in concentric relation with the said disc depicted on said outer convex face, one of said indicators bearing the names of the months in spaced relation and the other indicator being graduated to indicate the hours of the day.

8. As an article of manufacture, a star map comprising an initially hollow spherical body of resilient material collapsed along an equatorial bending line into the shape of a double-walled hemispherical bowl; a star map originally depicted on the outer surface of said spherical body and arranged to appear on the inner concave surface of said bowl; an arcuate member located between the inner and outer walls of said double-walled bowl, said arcuate member carrying pivots fixing the locations of the polar points and adapted to define said equatorial bending line and indicator means to position said arcuate member and said bending line relative to a selected chronical period.

9. As an article of manufacture, a star map comprising an initially hollow spherical body of resilient material collapsed along an equatorial bending line into the shape of a double-walled hemispherical bowl; a star map originally depicted on the outer surface of said spherical body and appearing on the inner concave hemispherical surface of said bowl, the constellations depicted on said star map always appearing in the same aspect as the natural constellations in the natural sky at all positions of their traverse across the visible heavens; an arcuate member pivotally mounted between the inner and outer walls of said double-walled bowl, said arcuate member provided with pivots adapted to fix the location of the polar points and kinematically limiting the motion of the map walls to circular swings around said polar points as centers, in exact reproduction of the apparent motions of the natural sky about the celestial polar axis and indicator means to position said arcuate member and equatorial bending line to a selected chronical period.

10. As an article of manufacture, a star map formed from a hollow spherical body of thin resilient material collapsed into the shape of a double-walled hemispherical bowl, the inner concave surface of said bowl representing in miniature the apparent bowl of the natural sky as seen by an observer on the earth; a star map depicted on the inner concave hemispherical surface of said bowl, the constellations on said star map always appearing in the same aspect as the natural constellations in the natural sky at all portions of their traverse across the visible heavens; an arcuate member located in the space between the inner and outer walls of said double-walled bowl, said arcuate member carrying pivots fixing the locations of the polar points and kinematically limiting the motion of the map walls to circular swings around the polar points as centers, in exact reproduction of the apparent motions of the natural sky about the celestial polar axis; an indicator disc secured to one of the pivot pins of said arcuate member and positioned in substantial parallel relation to and outwardly of the convex outer surface of said hemispherical bowl; another indicator depicted on said outer convex surface in concentric relation with said disc; one of said indicators bearing the names of the months and the other indicator being graduated to indicate the hours of the day; means allowing the map area to be changed at will so as to depict in turn the complete cycle of sky panorama for each hour, day and month throughout the astronomical year.

CLAUDE M. HOUSTON.